Dec. 3, 1963     L. L. OH     3,113,267
APPARATUS TO MEASURE STANDING WAVES AT VERY HIGH
FREQUENCIES INCLUDING A SERPENTINE
CONDUCTOR CONFIGURATION

Filed Aug. 18, 1961     2 Sheets-Sheet 1

INVENTOR.
LUIS L. OH
BY
Reynolds & Christensen
ATTORNEYS

Dec. 3, 1963

L. L. OH 3,113,267

APPARATUS TO MEASURE STANDING WAVES AT VERY HIGH
FREQUENCIES INCLUDING A SERPENTINE
CONDUCTOR CONFIGURATION

Filed Aug. 18, 1961

INVENTOR.
LUIS L. OH
BY
Reynolds & Christensen
ATTORNEYS

United States Patent Office 3,113,267
Patented Dec. 3, 1963

3,113,267
APPARATUS TO MEASURE STANDING WAVES AT VERY HIGH FREQUENCIES INCLUDING A SERPENTINE CONDUCTOR CONFIGURATION
Luis L. Oh, Seattle, Wash., assignor to The Boeing Company, Seattle, Wash., a corporation of Delaware
Filed Aug. 18, 1961, Ser. No. 132,409
8 Claims. (Cl. 324—58)

This invention relates to improvements in techniques for measuring standing waves, particularly in the VHF region of the frequency spectrum, and has for its broad object to provide apparatus of this type which is much more compact in terms of physical length than conventional slotted coaxial lines and guides commonly used for that purpose. The invention is herein illustratively described by reference to the presently preferred embodiments thereof; however, it will be recognized that certain modifications and changes therein with respect to details may be made without departing from the essential features involved.

The accepted technique for measuring unknown load impedance or other terminus of a transmission system which is to be energized at a predetermined frequency is to employ a standing-wave detector such as a slotted line or waveguide interposed between the load and the source of VHF energy. First, the slotted line or guide section in the standing wave detector is shorted at its load end and is energized by the generator connected to the opposite end. The location of a loop or node point along the line is then determined by means of a traveling pickup or probe, whereupon the short-circuiting connection is replaced by the unknown load, and the line re-energized. The resultant shift in location of the selected loop or node point is then determined in electrical wavelengths in the line. In addition, the standing-wave ratio in the line is measured using the same pickup. A crystal detector or other square-law detector produces a response proportional to the square of the field strength acting on the pickup, and therefore to the power flowing. From this standing-wave ratio and the measured shift in the standing-wave pattern, it is possible to determine the load impedance using recognized methods of mathematical calculation or graphical techniques such as the Smith impedance charts, for example.

With conventional slotted-line standing wave detectors, however, wherein the wavelength in the line is virtually that in free space, the physical length of the slotted line which is necessary in order to provide at least a half-wavelength of travel for the probe becomes prohibitively great for many applications, such as those in the lower end of the VHF frequency band. A half-wavelength coaxial line at 25 megacycles per second, for example, would be over 20 feet long and obviously too long for convenience in laboratory measurements and too long for ready portability. The present invention affords equivalent or superior results with a measurement section of transmission line which may be physically only a small fraction (such as one-eighth or less) of the length of a conventional slotted line operable at the same frequency.

A related object is to provide such a standing wave measuring apparatus of simple, light-weight, low-cost construction. The usual critical machining tolerances required in conventional slotted lines are made unnecessary herein.

In accordance with this invention as herein disclosed, an elongated conductor of serpentine configuration is superposed in insulated spaced relationship to an opposing conductor which may comprise a ground plane, for example, or a similar serpentine conductor placed in physical phase registry with the first conductor, and cooperating therewith as the opposing conductors of a transmission line measurement section. One end of this transmission line is adapted for connection to a source of high-frequency energy and the opposite end for connection to a load or terminal system with respect to which measurements are to be made. A probe or pickup element is mounted to move lengthwise along the broad side of the serpentine configuration through a range of positions equal to or exceeding one-half electrical wavelength. Normally it is mounted to move along substantially the transverse midline thereof; however, this is not critical, and in fact the path of movement may be located practically at the very edge of the serpentine configuration if desired.

Uniquely, it is found that such a transmission line configuration sustains a slow or retarded wave longitudinally thereof which exhibits a standing-wave pattern like the standing-wave pattern which exists along the lineal length of the serpentine conductor itself. Moreover, the pickup probe, if spaced outwardly somewhat from the broad side of the serpentine configuration, experiences a smooth variation in excitation as it moves progressively along the line section. Standing-wave measurements thus made with respect to the described slow wave along the measurement section of line are found to be directly representative of the same standing-wave measurements which would be made on the same serpentine conductor if it were stretched out to its full length, taking into consideration, of course, the compression of wavelength along the serpentine line with respect to that occurring along a lineal coaxial line. However, the compression of wavelength can readily be calculated in terms of design characteristics of the line and easily incorporated in the interpretation of standing wave measurements, as will hereinafter be more fully explained.

These and other features, objects and advantages of the invention will become more fully evident from the following description thereof by reference to the accompanying drawings.

Figure 1:
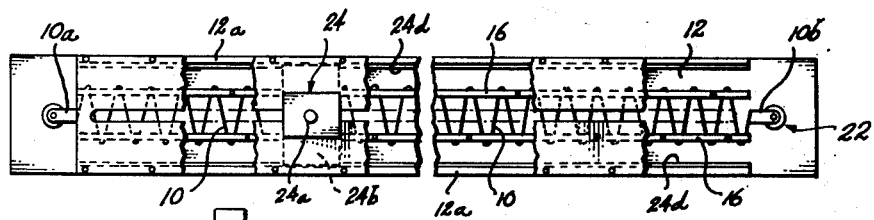
FIGURE 1 is a top view showing a device for performing standing wave measurements in accordance with this invention, parts being broken away to show interior construction.
Figure 2:
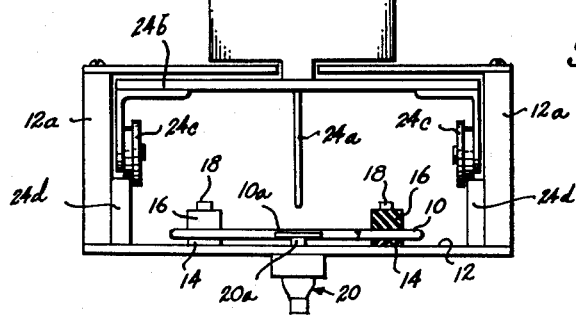
FIGURE 2 is an end view of the same unit, taken partly in section.
Figure 3:
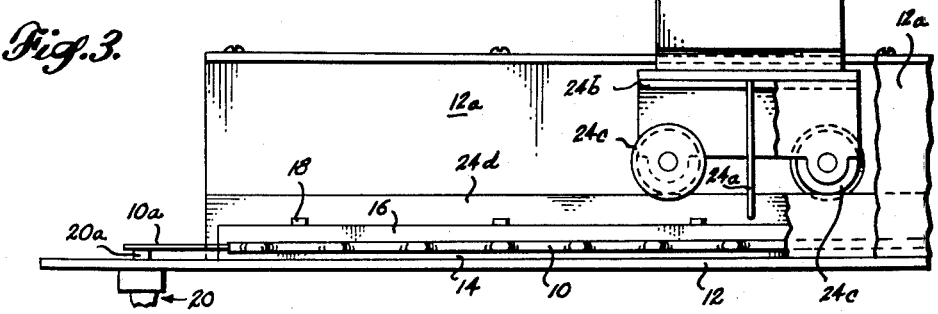
FIGURE 3 is a sectional side view of the same unit.

Referring to the drawings, while there are various ways in which the transmission line measurement section conductors may be formed and mounted in relation to each other, that shown in the embodiment of FIGURES 1 to 3 is typical. The elongated serpentine conductor 10 of zig-zag configuration is mounted in spaced superposed relationship with the metal plate conductor 12 which forms a conductive ground plane facing the serpentine conductor. The two conductors are held apart by the insulation strips 14 and are clamped against opposite sides of these strips by the elongated dielectric strips 16 and the dielectric screws 18 passed through the latter and threaded into the plate 12.

At one end, conductor 10 has a terminal element or lug 10a which is connected to the central conductor 20a of a coaxial line fitting 20 mounted in the plate 12 and having an outside conductor in electrical contact with such plate, as ground. At its opposite end a similar terminal lug 10b is connected to the coaxial line fitting 22. These terminal couplers serve to connect the measurement section of transmission line at one end to a load (not shown) and at its opposite end to a VHF energy source (not shown).

In addition, suitable support means are provided for the traveling probe or pickup assebmly 24 by which standing wave conditions along the measurement section of transmission line are detetced. This pickup assembly 24 comprises in this case a conductive probe 24a which is supported preferably in substantial alignment with the longitudinal midplane or line of symmetry LC of the serpentine conductor 10, with the extremity or tip of the probe spaced a short but appreciable distance from the adjacent broad side of the serpentine conductor. However, as previously stated, it is found that the probe may be arranged to move along the broad side of the serpentine configuration along any of different lines generally parallel to line LC. The probe conductor 24a extends inwardly of a suitable housing comprised in the assembly 24 wherein are mounted suitable circuit elements of a square-law detector which may be conventional.

In this case the probe assembly 24 is mounted on a support 24b having wheels 24c engaging tracks or guides 24d which in turn are fixedly supported from or upon the conductive plate 12. Side walls 12a projecting upwardly from the sides of the plate 12 serve to provide a closure, although they need not be of metal since it is not necessary to confine high-frequency field energy in such a transmission line arrangement. The close proximity of the serpentine conductor and the opposing conductor comprising the surface of ground plane plate 12 avoids problems of energy radiation and of erratic measurements due to proximity of physical objects. Obviously, other means to support and guide a pickup probe assembly for adjustive positioning along the measurement section of transmission line may be provided within the same spirit and framework of the invention, so that the details in these respects are largely secondary.

Figure 4A:
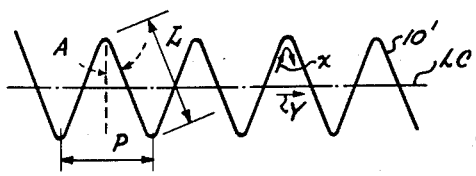
FIGURE 4A is a diagram of a serpentine conductor usable in the disclosed apparatus.

Referring to FIGURE 4A wherein dimensional characteristics of a length of serpentine conductor 10' are illustrated, "L" designates the length of segments or stretches of conductor between loop points, the half-angle of the loops is "A" and the pitch distance is "P." When such a line conductor is energized wave propagation occurs linearly along the sinuous length of the conductor 10', as indicated by the arrow X. However, it is found that there will also be linear slow-wave propagation occurring along a general path Y parallel to the median axis or line LC. If a pickup probe is not placed too close to the actual conductor surfaces movement of the probe along the line LC is accompanied by a smooth variation in the intensity of the field picked up by the probe and is not subject to incremental or stepwise changes in intensity, as might be expected. Probe spacing from the line is easily adjusted until a smooth variation is attained. As previously indicated, it is found that the standing-wave pattern represented in this slow-wave propagation condition detected by such a probe is equivalent to the standing-wave pattern represented by the normal propagating wave (X) moving along the total lineal length of the sinuous conductor 10'.

Expressed mathematically, and in order to derive the wave retardataion factor of the serpentine line measurement section for purposes of interpreting the standing-wave measurements made thereon, if $\lambda_0$ is the free-space wavelength and $\lambda_s$ is the serpentine line wavelength (i.e., along median line LC or lines parallel thereto), then the ratio of free-space wavelength to serpentine line wavelength, termed the wave retardation factor of the line, is expressed approximately as follows:

$$\frac{\lambda_0}{\lambda_s} = \csc A = \frac{2L}{P}$$

The characteristic impedance of the serpentine line cooperating with a conducting ground plane can be calculated as the impedance of a straight wire conductor over an infinite ground plane. If the spacing between the serpentine line and the ground plane is small compared to the spacing between adjacent legs of the line, the error due to the increased distributed capacitance is negligible. Therefore, the characteristic impedance $Z_0$ of a serpentine line is $$Z_0 = \frac{n}{2\pi\sqrt{\epsilon}} \cosh^{-1} \frac{2h}{d}$$

$$Z_0 = \frac{60}{\sqrt{\epsilon}} \cosh^{-1} \frac{2h}{d}$$

where $n = 120\pi$ (i.e., intrinsic impedance of air); $\epsilon$ = relative dielectric constant surrounding the conductor of the serpentine line; $h$ = distance between the center of the conductor and the ground plane; and $d$ = diameter of the conductor 10'.

In one practical embodiment of the invention, wherein the serpentine line was formed from 3/16 inch aluminum rod and was housed in an aluminum casing one wall of which served as the ground plane, the total weight of the unit, including probe assembly, was only thirty pounds and the outside dimensions of the housed transmission line section were only 3¾ inches by 6 inches by 36 inches. The unit was capable of measuring standing waves in a frequency range from as low as 25 megacycles to about 200 megacycles, with a characteristic impedance in the line itself of 50 ohms ± 1 ohm, a wave retardation factor of 8, a residual voltage standing-wave ratio of 1.05, and a short-circuit condition voltage standing-wave ratio of 100:1. Such a device is readily manufacturable by inexpensive present-day production techniques and may even be manufactured using printed circuit techniques, if desired.

Figure 4B:
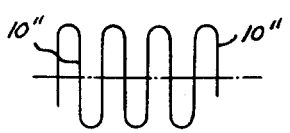
FIGURE 4B is a diagram of a somewhat modified serpentine configuration also usable in the apparatus.

FIGURE 4B shows a serpentine conductor in which the ends of the convolutions are less sharply pointed than those of conductor 10' in FIGURE 4A. In this case the serpentine conductor 10'' has more gently rounded ends and the interconnecting sides 10''s are arranged in parallel relationship rather than at a slope angle 2A with relation to each other. However, the same general principles of operation apply here as in the preceding embodiment. Calculations of compression factor in this case are based on an assumed angle A which represents the effective angle of a zig-zag line having the same pitch and sharply bent ends as in FIGURE 4A.

Figure 6:
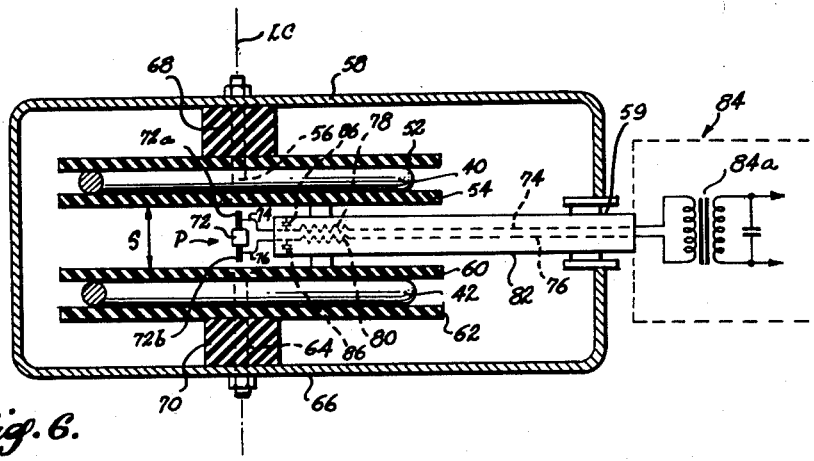
FIGURE 6 is a transverse sectional view of a practical version of the apparatus schematically shown in FIGURE 5.
Figure 5:
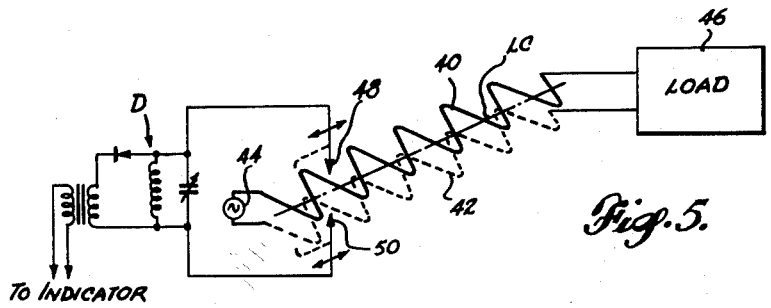
FIGURE 5 is a simplified schematic view of a modified standing wave measuring device with the serpentine conductors thereof viewed in perspective.

Referring to the modified embodiment shown in FIGURES 5 and 6, applicable to situations in which a balanced electrical system is required (i.e., neither side grounded or referenced to a fixed potential). the measurement section of line is formed by two serpentine conductors 40 and 42 mounted in mutually superposed positions of phase registry. These are separately insulated from ground and from each other and at one end are connected to the desired VHF source 44 and at the opposite end to a suitable load or system 46. Two cooperating probes or pickup elements 48 and 50 are mounted to sense the field intensity adjacent each of the respective serpentine conductors along the longitudinal center line LC thereof or along a parallel line, and the respective probes are connected to opposite sides of a suitable detection circuit D (FIGURE 5) in order to operate a suitable detection circuit D (FIGURE 5) in order to operate a suitable indicator (not shown) in accordance with the differential sum of the resultant detected signals.

As shown in FIGURE 6, conductor 40 held between insulating plates 52 and 54 is mounted on one side of a housing or other support 58 by dielectric screws 56. Similar dielectric holding plates 60 and 62 and clamp screws 64 maintain the conductor 42 in fixed relation to an opposite support 66. Dielectric spacer strips 68 and 70 are interposed between the respective housing sides 58 and 60 and the conductor supports. A space S between the individual conductors is provided to accommodate the movable probe unit P. This probe unit comprises a solid-state rectifier 72 of the square-law type having oppositely directed terminal wires used as probes 72a and 72b which project from the rectifier body toward the respective serpentine conductors 40 and 42. Probe conductors 72a and 72b are respectively connected to lead-off wires 74 and 76 extending in a shield conductor 82 to a detection circuit 84. Resistors 78 and 80 are interposed serially in the respective lead-off conductors, whereas by-pass capacitance elements 86 by-pass the R-F signal components at the detector end of the shielded pair 74 and 76, so that only a low-frequency modulation of the carrier may reach detector circuit 84. An audio transformer 84a within the detector apparatus provides voltage suitable for operating an indicator as desired.

Probe assembly P is suitably mounted in a slot 59 in the housing surrounding conductors 40 and 42 in order to move the probe assembly lengthwise of the housing along the line LC. By such an ararngement the R-F detection portion of the system is shielded so that the presence of persons or objects cannot interfere with the resultant indications. With miniaturized detectors 72, as are readily available, the serpentine conductors 40 and 42 need not be spaced apart by more than an inch or less to accommodate the probe and allow some spacing between the extremities of the detector probe wires 72a and 72b and the adjacent sides of the conductors 40 and 42.

Figure 7:
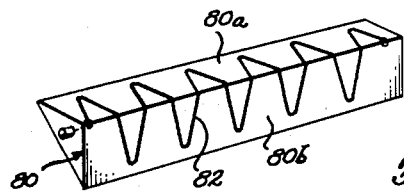
FIGURE 7 is a simplified perspective view of a modified conductor arrangement in which a serpentine conductor cooperates with a ground plane to form a transmission line measurement section.
Figure 8:
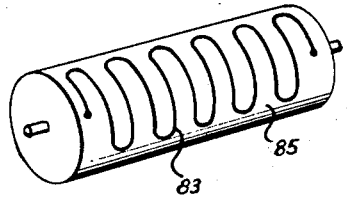
FIGURE 8 is a variation of FIGURE 7.

In FIGURE 7 there is shown a modification for the arrangement of the serpentine conductor and opposing conductor. In this case the opposing conductor comprises the two dihedrally related sides 80a and 80b of a conductive member 80. The serpentine conductor 82 mounted in spaced relation to the conductor 80 is bent along its longitudinal center line in order to cooperate with the respective dihedral sides 80a and 80b for purposes of achieving some reduction of width of the transmission line measurement section. An alternative to the same end is shown in FIGURE 8 wherein the serpentine line 83 is wrapped partially around a cylindrical conductor 85 as the opposing ground plane conductor.

These and other aspects of the invention will be recognized by those skilled in the art based on the foregoing description of the presently preferred practices thereof.

I claim as my invention:

1. Apparatus for measuring standing waves in an electromagnetic wave energy transmission system including a wave energy source and transmission system terminal means, said apparatus comprising a transmission line measurement section interposable in the system in the path of flow of such wave energy between said source and terminal means and subject to standing waves due to impedance mismatch between the measurement section and terminal means, said measurement section comprising an elongated serpentine conductor of zig-zag configuration, extending along an axis and comprising successively interconnected lengths of conductor disposed transversely across said axis, said serpentine conductor extending serially in the flow path, an opposing elongated conductor extending along one side of said serpentine conductor in proximate, substantially parallel, superposed relationship therewith, the spacing between said serpentine conductor and said opposing conductor being a small fraction of the spacing between successive conductor lengths along said axis, thereby to define a propagation space between said conductors for directing energy flow therealong, detector means including probe means positionable to pick up a small fraction of the energy flowing in said measurement section, and support means positioning said probe means and guiding the same for movement through a succession of pick-up positions and extending along the side of said serpentine conductor opposite said opposing conductor and generally parallel to the length thereof, thereby to detect standing waves in said section.

2. The apparatus defined in claim 1, wherein the opposing elongated conductor comprises a substantially continuous generally flat conductive surface presented flatwise to the serpentine conductor.

3. The apparatus defined in claim 1, wherein the opposing elongated conductor comprises means forming a generally continuous conductive surface having contiguous portions lying in different planes and presented flatwise to the respective opposing portions of serpentine conductor.

4. The apparatus defined in claim 1, wherein the opposing elongated conductor comprises a second serpentine conductor of similar size and zig-zag configuration superposed in registry with the first serpentine conductor, and the probe means comprises cooperating probe elements stationed at corresponding positions on opposite sides of the section and movable conjointly therealong.

5. The apparatus defined in claim 1, wherein the opposing elongated conductor comprises a second serpentine conductor of similar size and configuration superposed in spaced registry with the first, and the probe means comprises a rectifier element interposed in the space between said serpentine conductors intermediate the longitudinal side edges of their serpentine configuration, said rectifier element having probe conductors projecting oppositely therefrom, means supporting said rectifier with its probe conductors transverse to the serpentine conductors and to move lengthwise of the latter, and detector circuit means having input sides connected electrically to the respective probe conductors.

6. Standing-wave measurement apparatus comprising an elongated conductor of serpentine configuration extending along an axis and including successively interconnected lengths of conductor disposed transversely to said axis, an opposing conductor mounted in superposed insulated relationship to said serpentine conductor, and at a transverse spacing therefrom which is a small fraction of the spacing between successive conductor lengths along said axis, means for connecting said conductors to an energy source to energize the conductors cooperatively as a transmission line, means for connecting such transmission line to a load at a location spaced longitudinally thereof from the first-mentioned means by at least a half electrical wavelength in the transmission line and pickup means including a pickup element guided for movement along the length of said conductor serpentine configuration in a path spaced outward from one face thereof and disposed intermediate opposite longitudinal edges of the serpentine configuration thereof.

7. Standing-wave measurement apparatus comprising two similar elongated conductors of serpentine configuration, means mounting said conductors in substantially parallel mutually superposed insulated and spaced relationship, means for connecting said conductors to an energy source to energize the conductor cooperatively as a balanced transmission line, means for connecting such transmission line to a load at a location spaced longitudinally thereof from the first-mentioned means by at least a half electrical wavelength in the transmission line, and pickup means including balanced opposing probe means guided for movement along the length of said conductor serpentine configuration in a path spaced from contact with said conductors and disposed intermediate opposite longitudinal edges of the serpentine configuration thereof.

8. Standing-wave measurement apparatus comprising an elongated conductor of serpentine configuration comprising successively interconnected lengths of conductor, an opposing conductor mounted in superposed insulated relationship to said serpentine conductor, at a spacing therefrom which is a small fraction of the average spacing between successive lengths of conductor in said configuration, means for connecting said conductors to an energy source to energize the conductors cooperatively as a transmission line, means for connecting such transmission line to a load at a location spaced longitudinally thereof from the first-mentioned means by at least a half electrical wavelength in the transmission line, and pickup means including a pickup element guided for movement along the length of said conductor serpentine configuration in a path spaced outwardly from the face thereof.

References Cited in the file of this patent

UNITED STATES PATENTS

| | | |
|---|---|---|
| 2,126,541 | De Forest | Aug. 9, 1938 |
| 2,516,169 | Wong | July 25, 1950 |
| 2,545,544 | Doherty | Mar. 20, 1951 |
| 2,837,715 | Kandoian | June 3, 1958 |

FOREIGN PATENTS

| | | |
|---|---|---|
| 822,117 | Germany | Nov. 22, 1951 |
| 867,711 | Germany | Feb. 19, 1953 |